United States Patent
Navin-Chandra et al.

(10) Patent No.: US 6,275,820 B1
(45) Date of Patent: *Aug. 14, 2001

(54) SYSTEM AND METHOD FOR INTEGRATING SEARCH RESULTS FROM HETEROGENEOUS INFORMATION RESOURCES

(75) Inventors: Dundee Navin-Chandra, Farmington; Yong Gao, Canton, both of MA (US)

(73) Assignee: Perot Systems Corporation, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,783

(22) Filed: Jul. 16, 1998

(51) Int. Cl.$^7$ .................................................. G06F 17/30
(52) U.S. Cl. .................................................. 707/3; 10/103
(58) Field of Search .................................. 707/3, 10, 103

(56) References Cited

U.S. PATENT DOCUMENTS

| | | | |
|---|---|---|---|
| 4,805,134 | 2/1989 | Calo | 364/900 |
| 5,659,732 | 8/1997 | Kirsch | 395/605 |
| 5,692,176 | 11/1997 | Holt et al. | 1/1 |
| 5,710,918 | 1/1998 | Lagarde et al. | |
| 5,778,361 | * 7/1998 | Nanjo et al. | 707/5 |
| 5,897,446 | * 11/1999 | Corey et al. | 707/3 |
| 5,913,215 | * 6/1999 | Rubinstein et al. | 707/10 |
| 5,966,126 | * 10/1999 | Szabo | 345/348 |
| 5,987,454 | * 11/1999 | Hobbs et al. | 707/4 |
| 6,078,914 | * 6/2000 | Redfern | 707/3 |

* cited by examiner

Primary Examiner—Thomas Black
Assistant Examiner—Frantz Coby
(74) Attorney, Agent, or Firm—Jenkens & Gilchrist

(57) ABSTRACT

A system and method for relative ranking and contextual summarization of search hits from multiple distributed, heterogeneous information resources based upon the original content of each hit is disclosed. In particular, the system and method of the present invention improve upon metasearch engine techniques by downloading the original documents (text or multimedia) identified by standard search engines as relevant and using the original content of each "hit" to re-rank them relative to each other according to the original query pattern for the search, providing a uniform ranking methodology for the user. The present invention is also directed to an improved summarization process where the downloaded documents are re-summarized relative to each other according to the original query pattern for the search, providing a uniform summarization methodology for the user.

40 Claims, 4 Drawing Sheets

| HIT | RANK | SUMMARY |
|-----|------|---------|
| A.1 | R.A.1 | S.A.1 |
| A.2 | R.A.2 | S.A.2 |
| A.3 | R.A.3 | S.A.3 |

| HIT | RANK | SUMMARY |
|-----|------|---------|
| B.1 | R.B.1 | S.B.1 |
| B.2 | R.B.2 | S.B.2 |
| B.3 | R.B.3 | S.B.3 |

| HIT | RANK | SUMMARY |
|-----|------|---------|
| C.1 | R.C.1 | S.C.1 |
| C.2 | R.C.2 | S.C.2 |
| C.3 | R.C.3 | S.C.3 |

SYSTEM AND METHOD FOR INTEGRATING SEARCH RESULTS FROM HETEROGENEOUS INFORMATION RESOURCES

RELATED APPLICATION

The instant application is related to another patent application of the Applicants and Applicants' Assignee, entitled "Search Engine System and Method Utilizing Context of Heterogeneous Information Resources", filed concurrently herewith, U.S. patent application Ser. No. 09/116,525, and incorporated herein by reference.

BACKGROUND OF THE INVENTION

1. Technical Field of the Invention

The present invention relates to computers and computer systems employing search engines for use on the World Wide Web and other sources of distributed information, and, in particular, to a method and system for an improved metasearch engine utilizing the original content from multiple, distributed, heterogenous information sources to generate search result rankings, summarizations, and categorizations.

Glossary of Terms

User: An agent, human or machine, which is the source of the information request.

Information Resource: Locations where information is stored electronically. This may include text and multimedia information. The information resources can provide search interfaces to the data they contain and/or provide menu-driven interfaces that allow the using agent to browse the information resources.

Hit: An atomic piece of information. A hit is typically used to refer to a specific document that is returned by a search engine. Hits are selected by the search engine from its typically vast set of documents.

Document: Any piece of electronic information. It can be a multimedia document containing text, graphics, video and sound. It can also be a program or other form of binary data.

Query: An encapsulation of what the user wants. A query can consist of the following: keywords, phrases, boolean logic, numbers, SQL statements, paragraphs or segments thereof, pictures, sketches, the context of the search, the types of documents required, and a list of information sources to contact.

2. Description of Related Art

Since the introduction of the personal computer in the early 1980's, the PC has been subject to constant change, ever increasing in capability and usage. From its earliest form in which the data accessible was limited to that which the user could load from a floppy disk to the typical multi-gigabyte hard drives common on PCs today, the amount of data and the ease of obtaining this data have been growing rapidly. With the fruition of the computer network, the available data is no longer limited to the user's system or what the user can load on their system. Local Area Networks (LANS) are now common in small businesses, and in such networks users may, in addition to their own local data, obtain data from other local stations as well as data available on the local server. Corporate networks and internetworks may connect multiple LANS, thereby increasing the data available to users. Larger still are Wide Area Networks (WANS) and Metropolitan Area Networks (MANs), the latter of which is designed to cover large cities.

The largest such network, commonly known as the World Wide Web or Internet, has introduced vast amounts of diversified information into the business place and home. The individual networks that make up the Internet include networks which may be served from sources such as commercial servers (.com), university servers (.edu), research networks and other networks of computers (.org, net), and military networks (.mil). These networks are located throughout the world and their numbers are ever increasing with an estimated 85,000 new domain registrations presently occurring each month with countless Internet sites spawned from those domains. Recent (1998) estimates on the size of the Internet suggest a staggering 320 million web pages and a U.S. user population over 57 million.

Such dramatic growth, however, is accompanied by a number of difficulties, one of which, as witnessed by most users of the Internet attempting to recover specific information from the vast amounts of data therein, is the logistical problem of effectively searching and recovering specific information on a given topic. Much progress has nonetheless been made in Internet navigation and management since the earliest days in which a user essentially had to know the exact location of specific data. The user's labor was then in entering cryptic command line strings to recover the known, targeted data.

The development and implementation of Hypertext Markup Language (HTML) greatly increased the usability of the Internet by enabling a user to navigate through graphically intensive pages, as opposed to the purely text-based interfaces of the previous decades' devices. This navigation is now facilitated by use of a web browser, e.g., Netscape Navigator, Microsoft Internet Explorer, etc. Hypertext, a method of cross-referencing, is now common on most web sites. A hypertext link appears as a word or phrase distinguishable from the surrounding text by a color or format distinction, or both. A user is able to click on a hypertext link and be transferred to another information service, which is often remote from the site with the originating hypertext link. Through the use of many such hypertext links, sites with similar content can be easily cross-referenced by the web developer allowing a user quick access to supplementary information that is distributed across the Internet.

Further facilitation of information access on the Internet has been made by numerous companies providing information search services, e.g., Infoseek, Yahoo, etc., that provide "engines" to search the Internet, generally at no charge to the user. These companies commonly index the contents of large numbers of web pages, either the page's full text or summaries, and allow a user to search through the indices through the search engines provided on the respective companies' web pages.

Search engines may be defined as programs allowing a user to remotely perform keyword searches on the Internet. The searches may cover the titles of documents, Uniform Resource Locators (URLs), summaries, or full text. Usually, information service providers build indices, or databases, of web page contents through automated algorithms. As described, these indices may be of the full text or only a brief synopsis of a web page's text. By utilizing these automated algorithms, the compilation of indices of large numbers of pages is possible. These algorithms are commonly referred to as Spyders. By using these index building algorithms, Infoseek was able to index the full text of over 400,000 web pages in August of 1995. Generally, the results or "hits" of the search are presented to the user with hypertext links allowing the user to pick and choose the desired results and then transfer to a particular site associated with the selected search results in order to retrieve the desired information on the web pages therein.

Additionally, search engines commonly perform computations on the results of the user's query in order to generate a relative ranking, against the other hits. The rankings assigned to each hit are intended to provide a measure of relevance of the content of a particular information source, identified as containing potentially relevant information, to the query presented. Relevance algorithms are used in most search engines and are based on simple word occurrence measures. For example, if the word 'plastic' occurs within the text of a page, then that page will have an expected relevance to a query containing the word plastic. The relevance is then assigned a magnitude in the form of a rank. Often the rank is quantified on a number of factors including the number of times the word occurs in a page, whether the word is in the title of the page, whether the word is in a heading, proximity of multiple search terms appearing in the page's text, etc. More sophisticated relevance algorithms may utilize thesaurus indices to automatically expand on a given query using equivalent phraseology.

A further and more recent improvement is the creation and usage of a so-called metasearch engine, e.g., MetaCrawler, Dogpile, Savvysearch, etc. A metasearch engine parses and reformats a user query. The reformatted queries are then forwarded to numerous search engines with each discrete search engine receiving an appropriately formatted query pursuant to the protocols for that search engine. After retrieving the results from the individual search engines, the metasearch engine presents them to the user. The obvious advantage of these metasearch engines is the simplification of searching due to the elimination of the need for a user to formulate and submit an individual query for each of a number of discrete search engines, a non-trivial task since the formats and protocols of each individual search engine differ markedly. By using a metasearch engine, the user only has to submit a single query, saving effort and time.

Even with the aforedescribed improvements in the search and metasearch systems, most users nonetheless spend a great amount of their search time reviewing and eliminating unwanted and irrelevant search results. Since searches of the various indices register hits merely when a search term and indexed term match, numerous hits are generated that match terms completely out of context and provide the user with meaningless results. Furthermore, present metasearch engines must rely on the individual search engines' results rankings. Each search engine uses algorithms to quantify the respective search engines' query results, these algorithms often having distinctively different ranking techniques. The results presented to the user, therefore, are often non-uniform in the sense that the results, having been obtained through numerous search engines, have relative relevance rankings assigned to them from distinctively different ranking methodologies. Some present day metasearch engines generally re-rank the query results so that the result rankings' appear to share a common scale. However, these re-ranked results are simply converted from their original form to a common form for presentation purposes, and the re-ranks are, therefore, purely aesthetic.

It is, accordingly, a first object of the present invention to provide an improved metasearch engine that uses the original ranks of a query result as assigned by the respective individual search engines and, additionally, re-ranks the results according to the actual content of the information source identified in the search results obtained from the individual search engines.

It is also an object of the invention to provide an improved system and method wherein a metasearch engine provides final ranks for the information sources, as identified by the individual search engines' results, according to a singular relevance algorithm after downloading the full text of the identified information sources, thereby providing a more uniform relevance ranking among the numerous information sources.

It is a further object of the invention to provide a system and method wherein query results summaries are produced within the metasearch engine with reference to the respective query and the full text of the information source document.

SUMMARY OF THE INVENTION

The present invention is directed to a system and method for relative ranking and contextual summarization of search hits from multiple distributed, heterogeneous information resources based upon the original content of each hit. In particular, the system and method of the present invention improve upon metasearch engine techniques by downloading the original documents (text or multimedia) identified by standard search engines as relevant and using the original content of each "hit" to re-rank them relative to each other according to the original query pattern for the search, providing a uniform ranking methodology for the user. The present invention is also directed to an improved summarization process where the downloaded documents are re-summarized relative to each other according to the original query pattern for the search, providing a uniform summarization methodology for the user.

BRIEF DESCRIPTION OF THE DRAWINGS

A more complete understanding of the system and method of the present invention may be obtained by reference to the following Detailed Description when taken in conjunction with the accompanying drawings wherein:

FIGS. 2A, 2B and 2C illustrate ranking and summary lists of search engine hits;

DETAILED DESCRIPTION OF THE PRESENTLY PREFERRED EXEMPLARY EMBODIMENTS

Although the preferred embodiments of the present invention may be embodied in many different forms, the invention should not be construed as limited to the embodiments set forth herein; rather, these embodiments are provided so that this disclosure will be thorough and complete, and will fully convey the scope of the invention to those skilled in the art.

Figure 1:
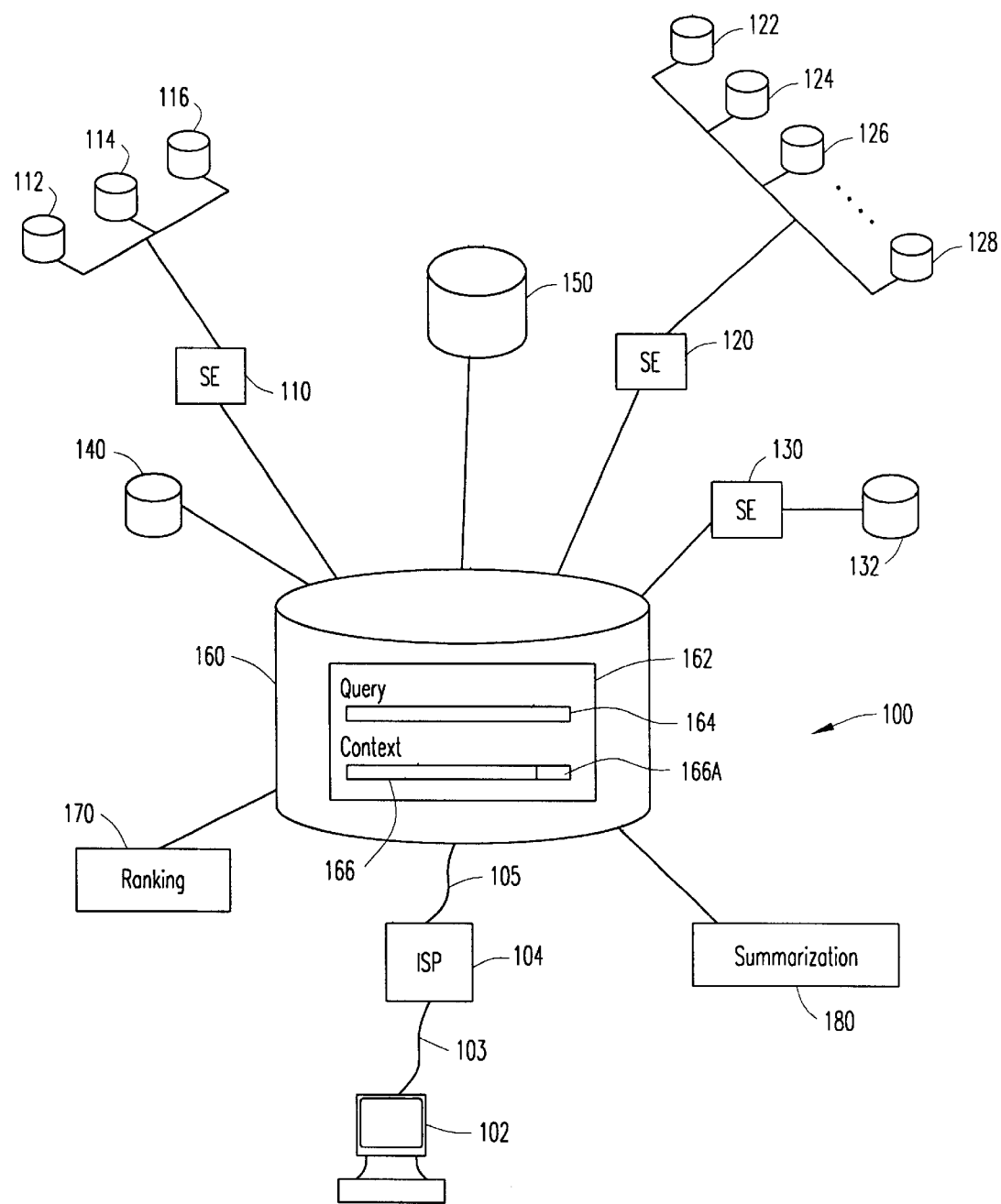
FIG. 1 illustrates an exemplary computer system configuration with a metasearch engine in accordance with the system and method of the present invention wherein the principles set forth in the invention may be utilized.

With reference now to FIG. 1, there is illustrated a network of computers as may be configured within a computer system 100, such as the Internet or an Intranet, and a computer 102 communicating with the computer system 100 via an Internet/Intranet Service Provider (ISP) 104 across a link 103 therebetween. It is understood that the user computer 102 could easily be included within the computer system 100 thereby alleviating the need for the ISP 104. Also illustrated in FIG. 1 are computers 112, 114, 116, 122, 124, 126, 128, 140 and 150 generally functioning to serve information to users operating within or through computer system 100 and referred to herein as information resources (IRs). Computers 110, 120 and 130 generally function to provide users, operating locally or remotely, search capabilities of information stored within the respective computer or to IRs in communication therewith and are generally referred to as search engines (SEs). A metasearch engine 162, such as is the subject of the present invention, is contained within and operated from a computer 160.

IRs 140 and 150 in FIG. 1 depict browseable information sources. Browseable is herein defined as an IR not necessarily having a search interface coupled thereon. A user retrieving information from such a source is therefore limited to manually investigating, or browsing, the contents of the IR. Access to IRs 140 and 150 is generally made directly via an appropriate Uniform Resource Locator (URL) or by cross references, i.e., a hypertext links, from other IRs. It is understood that the number of browseable IRs is currently very large (in the millions) and that only two of these IRs are included in computer system 100 depicted in FIG. 1 strictly for illustrative purposes.

A computer or server 130 is attached to IR 132, allowing a user, operating locally or remotely, to search the contents of IR 132 using a search engine on the computer 130. In addition to recovering information from IR 132 via the search engine on computer 130, IR 132 may frequently be accessed directly by an appropriate URL, i.e., cross references from other IRs. It is understood that the actual number of searchable IRs within a computer network 100, as with the potential browseable IRs, may also be very large.

A search engine on computer 110 provides search capabilities of a number of IRs, e.g., IRs 112, 114 and 116, to a user operating either locally or remotely. Similarly, a search engine on computer 120 provides search capabilities of IRs 122, 124, 126 and 128 and to a large number of other IRs (not illustrated but designated by the dots). The search engine on computer 120 is thus representative of a large Internet SE, e.g., Infoseek. The metasearch engine (MSE) 162, such as is the subject of the present invention, is preferably contained within and operated from computer 160, as discussed.

In the illustrative computer system 100, MSE 162 provides search capabilities to a number of SEs operating in communication therewith. Although MSE 162 is limited to SE access of computers 110, 120 and 130, it is understood that the number of SEs operating in conjunction with an MSE is virtually unlimited. In the ongoing discussion, it is also understood that MSE 162, upon receipt of a user query, parses a user query and reformats the query into, generally, a plurality of different formats, each format consistent with at least one of the formats required by the respective individual SE computers 110, 120 and 130. These SEs, upon receipt of the appropriately formatted query, interrogate their respective indices and return results to the MSE 162, i.e., a brief summary, excerpt or other data snippet, as is understood in the art. As discussed, each individual SE 110, 120 and 130 contains its own searchable indices compiled from the contents of at least one IR or appropriate interfacing to perform searches on the contents of at least one IR. Furthermore, it should be understood that the SE computers' 110, 120 and 130 indices may be compiled from different (as in FIG. 1) or common IRs, or both.

Continuing with the example shown in FIG. 1, a user at computer 102 submits a query to the MSE 162, which parses and reformats the query according to the protocol requirements of the respective SE computers 110, 120 and 130. The appropriately formatted queries are forwarded to the respective SEs whereupon each of the SEs interrogate their respective indices on their associated IR or IRs. After completing the search, each of the aforementioned SE computers forward their results back to the MSE 162.

It is understood that in prior art systems, query results from the SE computers 110, 120 and 130 are generally limited to a list of hits with a relevance rank and possible summary of the IR associated with the hit. Therefore, in the current example, MSE 162 would receive three lists of hits with relevance rank and summaries from the respective computers. MSE 162 is then responsible for formatting and presenting the results to the user. This is usually performed by a process referred to as "fusion" by numerous commercially available algorithms, the methodology of which are well known in the art. These algorithms manipulate the original hit rankings to create a combined list of results including hits from potentially each of SEs' result lists. Furthermore, the summaries included in the results presentation are also taken directly from those summaries passed to the MSE 162 from the respective SE computers 110, 120 and 130. These summaries may be manipulated in some manner by the MSE 162, e.g., abridging them further. The content of the hits summaries presented to the user by the MSE 162 are, therefore, limited to the content of the summaries originally passed to the MSE 162 from the respective SE computers.

Figure 2:
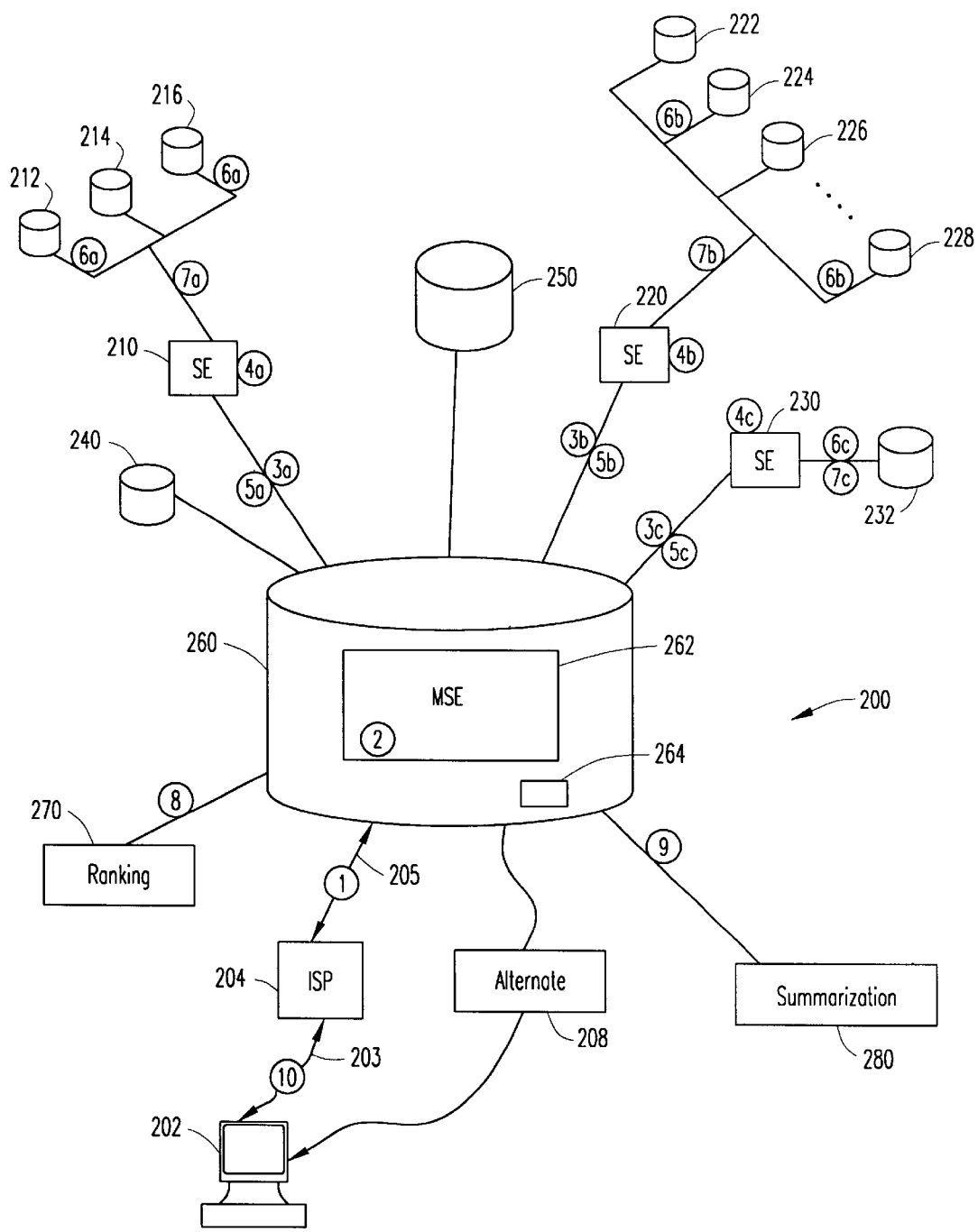
FIG. 2 illustrates the operation of the ranking and summarization aspects of the present invention using the computer system configuration of FIG. 1.

With reference now to FIG. 2, an event chronology of a metasearch in the computer system 100 of FIG. 1 is depicted. A user operating at computer 202 submits a query to MSE 262 via an ISP 204 (step 1, designated in the figure by the circled numeral). MSE 262 uses the query to determine which IRs to access. It then parses and reformats (step 2) the query into formats appropriate for the respective search engines on computers 210, 220 and 230, e.g., MSE 262 subsequently forwards an appropriately formatted query to the respective search engines (steps 3a,3b,3c). Each SE then interrogates their respective indices of the associated IRs and compiles a respective list of hits with associated ranks and summaries (steps 4a,4b,4c), shown in more detail in FIGS. 2A, 2B and 2C. FIG. 2A illustrates a list 211 compiled by the search engine on computer 210. The three hits, A.1, A.2 and A.3, the respective rankings, R.A.1, R.A.2 and R.A.3, and summaries, S.A.1, S.A.2 and S.A.3, are collected. Lists 221 and 231 in FIGS. 2B and 2C, respectively, contain similar contents.

It is understood that present day SEs often return recovered hit lists with hits numbering in the millions. For illustrative purposes, these results are limited to three hits per SE for the example accompanying FIG. 2. Furthermore, it is understood that the hits, e.g. A.1, B.1, etc., are generally reported as a hypertext link to the IR associated with the hit. Each of the result lists generated are then reported back to the MSE 262 (steps 5a,5b,5c). The MSE 262 then uses some "fusion" method to combine the results from the search engines A, B and C. The combined results are returned to computer 202. State of the art fusion algorithms are based on the ranks assigned by SEs A, B, C and, in some cases, the summaries or titles provided by A, B and C. This is the end point for other metasearch engines for other metasearch engines which fail to further analyze the results, as does the present invention.

As described, each of the SE computers 210, 220 and 230 in FIG. 2 have indices of at least one IR or, alternatively, a search interface to at least one IR. Since these SEs are, in general, operated independently, their indices compilation methods often differ distinctively, i.e., the full text, only abstracts, etc. Furthermore, each of the SEs may utilize search algorithms, relevance rank algorithms, and summarization methods having little or no correspondence between those algorithms and methods used by other SEs. Thus, the final query results compiled and presented to a user searching via the MSE 262 are often nonuniform with respect to the associated query.

It should be understood that the hits included in the results lists are normally specified in decreasing order of rank, e.g., R.A.1>R.A.2>R.A.3 in FIG. 2A. Upon reception of the result lists, the MSE 262 will recover the hits, or a subset thereof, from each of the reported results list. As aforementioned, the hits are provided in the form of a cross reference to the location, i.e., a URL, of a particular IR to which the hit is associated. Therefore, MSE 262 can access and recover the entire text or multimedia data associated with a hit.

With reference again to FIG. 2, after the MSE 262 recovers the lists 211, 221 and 231 of results, the MSE 262 may determine that only the top two hits within each list, i.e., A.1, A.2, B.1, B.2, C.1 and C.2, are pertinent to the query. The MSE 262 then communicates with the particular IRs storing the document or other item of interest, e.g., information resources 212 and 216 (step 6a), resources 224 and 228 (step 6b) and resource 232 (step 6c). The full texts of those designated documents or other textual item are then downloaded (via the respective SEs) to the computer 260 (steps 7a, 7b and 7c), as shown in FIG. 2.

Each of the downloaded full texts are then subjected to a ranking methodology 270 (step 8) associated with the MSE 262, and each item is assigned a new rank accordingly. The re-ranking performed by the system and method of the present invention re-evaluates the rankings given by the individual search engines by analyzing the whole document instead of a mere summary typically indexed by the search engines. Also, the system and method, by doing more than crudely melding or fusing the various disparate items into one list, which include many different ranking methodologies, orders the downloaded items in a manner directly pertinent and relevant to the user's query. It should, of course, be understood that an ordinary query in a real query situation would return hundreds if not thousands of hits or more. The enhanced relevancy analysis and re-ranking performed in accordance with the present invention provides an extremely useful tool in on-line research in a great variety of topics, eliminating much of the clutter normally encountered when using metatools of this sort, and allowing truly relevant documents to become readily apparent to the user by virtue of the re-ranking performed.

Figure 3A:
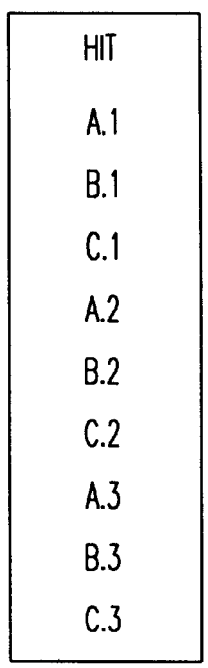
FIG. 3A illustrates an exemplary prior art ranking of search engine hits.

Shown in FIG. 3A is an example of a fused list constructed in accordance with the prior art. As is clear from a review of the ordering, a simple, mechanical procedure has been followed to present the items to the user. The crude ordering is not by topic or query relevancy, but by simple insertion, which in essence randomly distributes the documents within a final list, albeit some pertinent documents may be near the top. Other truly relevant documents, however, may well be placed at or near the bottom. The actual relevance of a given item, as determined by an analysis of the whole document in the re-ranking of the present invention, may present a list radically different from that shown in FIG. 3A, as illustrated by the list in FIG. 3B. As is apparent from comparing the two lists, whereas the prior list metasearch engine remotely combines each of the three hits from the three information resources, the metasearch engine of the system and method of the present invention may discard some of the downloaded "hits" as irrelevant and not display them, thereby accounting for the difference in size between the two lists in FIGS. 3A and 3B.

Similarly to the re-ranking process, the downloaded full texts are also subjected to a summarization methodology 280, also attached to MSE 262, whereupon each hit is assigned a new summary (step 9). The hits and the associated summaries and rankings, upon reordering, are then presented to the user (step 10). As with ranking, the heterogeneous methodologies employed in summarizing can appear confusing to the user when juxtaposed. By creating a new summary that is based on the user's query (using prior art of Profile based summarization), as with ranking, based upon the entire downloaded document (or other multimedia content), the user can be presented with consistent synopses, giving the user the appearance that the uniform search results obtained all come from the same source.

The invention as described may be further improved upon by employing those advances in MSE searching capabilities as taught in Applicants' co-pending application. Particularly, those IRs having not been indexed by at least one SE and not being equipped with a searchable interface, e.g., IRs 240 and 250 in FIG. 2, may also have hits returned by the present invention when operated in conjunction with the system and method of Applicants' co-pending application. For example, a search may be performed on such sites through browsing, crawling and data mining to ascertain whether relevant information (hits) are present and where, and return those documents in full-text for re-ranking and summarizing as set forth above, which as noted above is not performed by the various commercial metasearch engines currently in use.

In summary, the system and method of the present invention operate as follows: submit a query to the metasearch engine 262 that sends the query request to respective search engines 210, 220, and 230 that access a variety of information resources. The results are collected by the metasearch engine 262 and examined. Particular documents are slated for downloading and local storage in the computer 260, where the documents, such as binary documents, may be cleaned up. The new ranking and summarization are then performed.

It should also be understood that the system and method of the present invention may be utilized in a batch-mode context, as well as the real-time mode described hereinabove in which the user enters the query and waits for the results on their terminal 102 or 202. In batch mode, the user submits a batch query to the metasearch engine 162 or 262 that contains the following information: (1) the query, (2) the particular information resources that should be contacted, (3) the time interval or periodicity in which to run the batch query, and (4) the performed mode of receiving the results.

With reference again to FIG. 2, the user at terminal 202 submits a batch query similarly to the query described above. The query, instead of being immediately processed, is stored in a memory or database 264 within the computer 260. It should also be understood that the memory 264 may also be utilized in real-time applications that require queuing or other pre- or post-operations needing space to store intermediate or final results. With reference again to the batch-mode embodiment, the system 200 executes each batch mode query at the user-specified time intervals. For example, if the query is to be run each week, the system 200 will perform the actions of contacting all of the information resources associated with that batch query and collect the results, which, as discussed, are downloaded, ranked and summarized. The results may be transmitted to the user across lines 205 and 203 (through the ISP 204) or transmitted through an alternate mode module 208, depicted in FIG. 2, which is the user's specified mode of transmission. For example, the results may be converted into a facsimile, e-mail or other document format specified by the user and transmitted to the location specified by the user.

Figure 3B:
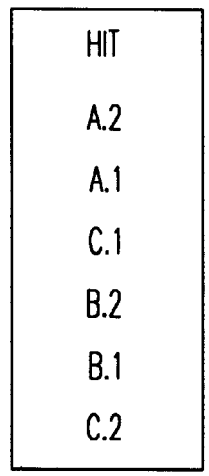
FIG. 3B illustrates the improved ranking of search engine hits pursuant to the system and method of the present invention.

As discussed, the refining technique set forth in the present invention is an improvement over the simple aggregation techniques of the prior art, as demonstrating in FIGS. 3A and 3B and described in the associated text. Also, regular search engines rely on their own pre-created indices and pre-created summaries, which as noted is at times erroneous, incomplete and/or misleading. Even so, the prior art approach may be acceptable in certain instances, such as where a metasearch engine utilizes Altavista, Lycos, Excite and other such standard search engines, which on average have about the same domain space, i.e., the web, and the disparate search engine results bear some relationship to each other.

This, however, does not hold true when metasearching specific domains, i.e., subsets of the web, often obscure subsets such as in particular industries, e.g., plastics. A plastics metasearch may include search sites such as plasticsnet, GE plastics, BASF plastics, polymer.com, etc. It should, of course, be understood that the top hits from these sites are not all good hits for a given query. It is, therefore, necessary to download the original document for each hit and re-rank and re-summarize them relative to the current query for consistency and uniformity of appearance.

It has also been discovered, however, that even among a number of general web search engines that ostensibly share domain space, queries on some of the engines are better served on particular ones. The re-ranking of the present invention has been observed to bring the best results to the top of the list.

It should also be understood that by increasing the bandwidth of data needed, i.e., the whole document versus the original search engine result, the response time of the computer system 100 or 200 employing the technology of the present invention will be slower than traditional search and metasearch engines. In the preferred embodiment of the present invention, however, both approaches are offered the user: a traditional approach that is fast, i.e., the standard, simple ranking and diverse summarization approaches of the current art, and the improvements of the present invention that produce better results at the cost of more time, which with increasing processor speed continually diminishes. The traditional search results, initially gathered by the metasearch engine from the diverse search engines (and other sources) may be displayed immediately while the more detailed analysis is processing.

It should be understood that the present invention, in addition to providing improvements in ranking and summarization, can also be applied in handling search engine results that are categories or clusters. In addition to a ranking hierarchy in relation to the query, the various search engines may also return a category or cluster identifier associated with the particular information resource. In a preferred embodiment of the present invention, a categorization is performed every time the user queries the system, and categories are assigned using the original content of each hit every time. This approach, it should be understood, is in direct contrast to current methodologies that employ pre-collected, pre-categorized documents, e.g., www.nlsearch.com and www.infoseek.com. For example, when the metasearch engine 162 or 262 receives the ranking and summarization data from the respective information resources, as shown in FIGS. 2A, 2B and 2C, an additional field, category, is also supplied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for searching heterogeneous information resources using a user query within a distributed computer system, said method comprising the steps of:

receiving, at a metasearch engine on a host computer within said distributed computer system, a plurality of search engine results in response to respective queries to each of a corresponding plurality of search engines, said search engine results being generated from said heterogeneous information resources;

selecting, within said metasearch engine, a given plurality of relevant search engine results from respective ones of said plurality of search engines;

retrieving, from said respective ones of said search engines, respective original documents corresponding to said given plurality of relevant search engine results, each of the relevant search engine results being a portion of a respective original document, said respective original document including at least one of the following: full text or multimedia data;

downloading said retrieved respective documents to said host computer;

evaluating said downloaded respective documents pursuant to the original content of each of said downloaded respective documents;

summarizing said evaluated respective documents pursuant to the respective contents of each said evaluated respective document and to an original query pattern; and ranking said evaluated respective documents pursuant to the content of each of said evaluated respective documents, original ranks of said given plurality of relevant search engine results, and to an original query pattern, said ranking generating final ranks for said evaluated respective documents.

2. The method according to claim 1, further comprising the step of:

summarizing said respective documents pursuant to the respective contents of each said respective document and to said user query.

3. The method according to claim 1, further comprising the step of:

categorizing said respective documents pursuant to the respective contents of each said respective document and to said user query.

4. The method according to claim 1, wherein said ranking further comprises ordering said evaluated respective documents pursuant to a uniform relevance determination.

5. The method according to claim 1, further comprising the step of:

inputting said user query into said host computer.

6. The method according to claim 1, wherein prior to said step of receiving said search engine results, said metasearch engine converts said user query into said respective queries to said corresponding plurality of search engines and forwards said respective queries to the respective plurality of search engines.

7. The method according to claim 6, wherein said conversion of said user query and forwarding said respective queries occurs substantially in real time.

8. The method according to claim 6, further comprising:
storing, in a batch mode, said user query within said host computer; and
converting said user query and forwarding said respective queries at a user-specified time interval.

9. The method according to claim 1, further comprising the step of:
outputting said respective documents to a display device.

10. The method according to claim 9, wherein said respective documents are queued, and outputted thereafter at a user-specified time interval.

11. The method according to claim 9, wherein said outputting comprises faxing said respective documents to a facsimile device.

12. The method according to claim 9, wherein said outputting comprises emailing said respective documents.

13. The method according to claim 1, further comprising, prior to said step of receiving, the step of:
querying said plurality of search engines with said respective queries.

14. The method according to claim 13, wherein said search engines access an index therein corresponding to a plurality of browsable information sources.

15. The method according to claim 1, further comprising the step of:
displaying, on a display device, a ranking of said respective documents, ranked pursuant to the content therein and said user query.

16. The method according to claim 15, further comprising, prior to said displaying of said ranking of said respective documents on said display device, the step of:
displaying, on said display device, said plurality of said search engine results.

17. The method according to claim 1, wherein said step of ranking re-ranks said evaluated respective documents pursuant to a uniform relevance determination methodology.

18. The method according to claim 1, wherein said respective queries to said plurality of search engines further comprise a user categorization identifier.

19. A computer system for searching information resources pursuant to a user query, said computer system comprising:
a metasearch engine, on a host computer within said computer within said computer system, for receiving a plurality of search engine results in response to respective queries to each of a corresponding plurality of search engines, said search engine results being generated from said heterogeneous information resources;
selecting means, within said metasearch engine, for selecting a given plurality of relevant search engine results from respective ones of said plurality of search engines;
retrieving means, within said metasearch engine, for requesting respective original documents corresponding to said given plurality of relevant search engine results from said respective ones of said plurality of search engines, each of the relevant search engines results being a portion of a respective original document, and receiving said original respective documents, said respective original documents including at least one of the following: full text or multimedia data;
downloading means, within said metasearch engine, for downloading said retrieved respective documents to said host computer;
evaluating means, within said metasearch engine, for evaluating said downloaded respective documents pursuant to the original content of each of said downloaded respective documents;
summarizing means, within said metasearch engine, for summarizing said evaluated respective documents pursuant to the respective contents of each said evaluated respective document and to an original query pattern; and
ranking means, within said metasearch engine, for ranking said evaluated respective documents pursuant to the content of each of said evaluated respective documents, original ranks of said given plurality of relevant search engine results, and to an original query pattern, said ranking generating final ranks for said evaluated respective documents.

20. The computer system according to claim 19, further comprising:
an input device, attached to said host computer, for inputting said user query.

21. The computer system according to claim 19, wherein said metasearch engine comprises a query conversion means for converting said user query into said respective queries to said corresponding plurality of search engines, said metasearch engine forwarding said respective queries to the respective plurality of search engines.

22. The computer system according to claim 21, wherein said metasearch engine converts said user query and forwards said respective queries substantially in real-time.

23. The computer system according to claim 21, wherein said metasearch engine stores said user query therein in a batch mode, said conversion and forwarding being performed at a user-specified time interval.

24. The computer system according to claim 19, further comprising:
an output means, attached to said metasearch engine, for outputting said respective documents to a display device.

25. The computer system according to claim 24, further comprising:
a queuing means, attached to said output means, for queuing said respective documents.

26. The computer system according to claim 25, wherein said queuing means outputs said respective documents at user-specified time intervals.

27. The computer system according to claim 24, wherein said output means forwards said respective documents to a facsimile device.

28. The computer system according to claim 24, wherein said output means forwards said respective documents via email.

29. The computer system according to claim 19, wherein said respective documents are retrieved by said retrieving means from respective browsable information sources.

30. The computer system according to claim 29, wherein said respective browsable information sources are attached to the Internet.

31. The computer system according to claim 29, wherein said retrieving means utilizes respective Uniform Resource Location addresses to retrieve said respective documents.

32. The computer system according to claim 29, wherein said respective browsable information sources contain hypertext therein.

33. The computer system according to claim 29, wherein a plurality of said respective documents are retrieved by said retrieving means from respective servers.

34. The computer system according to claim 29, wherein a plurality of said respective documents are retrieved by said retrieving means via an intermediate server in communication with respective browsable information sources.

35. The computer system according to claim 29, wherein said respective browsable information sources are indexed.

36. The computer system according to claim 19, further comprising:
   a display means, attached to said host computer, for displaying said plurality of search engine results and said respective documents, said plurality of search engine results being displayed while said respective documents are retrieved by said retrieving means.

37. The computer system according to claim 19, further comprising:
   a display means, attached to said host computer, for displaying, in response to a user selection, said plurality of search engine results for said respective documents.

38. The computer system according to claim 19, wherein said ranking means further comprises summarization means for summarizing said respective documents pursuant to the respective contents of each said respective document and to said user query.

39. The computer system according to claim 19, wherein said ranking means further comprises categorization means for categorizing said respective documents pursuant to said user query.

40. The computer system according to claim 19, wherein said ranking means re-ranks said evaluated respective documents pursuant to a uniform relevance determination methodology.

* * * * *